United States Patent [19]
Friedell

[11] 4,013,264
[45] Mar. 22, 1977

[54] FLOW CONTROL VALVE WITH ISOLATED SEQUENCE CONTROL MECHANISM

[75] Inventor: Morley V. Friedell, Wheat Ridge, Colo.

[73] Assignee: Martin Marietta Corporation, Rockville, Md.

[22] Filed: Aug. 14, 1975

[21] Appl. No.: 604,760

[52] U.S. Cl. .............................. 251/56; 251/133; 251/134; 251/162; 251/192

[51] Int. Cl.² .................. F16K 31/04; F16K 39/06

[58] Field of Search ............ 251/133, 163, 56, 161, 251/162, 192, 134

[56] References Cited

UNITED STATES PATENTS

| 2,847,180 | 8/1958 | Ludeman | 251/163 |
|---|---|---|---|
| 3,033,513 | 5/1962 | Vulliez | 251/163 |

FOREIGN PATENTS OR APPLICATIONS

| 518,592 | 11/1955 | Canada | 251/133 |

Primary Examiner—Arnold Rosenthal
Attorney, Agent, or Firm—Sughrue, Rothwell, Mion, Zinn & Macpeak

[57] ABSTRACT

A cylindrical flow tube of tapered cross section bears a spherical valve poppet on one side and is mounted within the valve casing for rotation between an axially in-line position relative to an annular valve seat and a position at right angles thereto, the flow tube acting to spring bias the valve poppet against the valve seat. Translation and rotation plates are sequentially clutch driven by an interposed drive plate and carry individual pinions for driving racks associated with concentric rotation and translation shafts for pivoting the flow tube and the spherical poppet and seating the poppet in sequence during valve closing. The sequence control mechanism is hermetically sealed from the translation and rotation shafts.

23 Claims, 17 Drawing Figures

FLOW CONTROL VALVE WITH ISOLATED SEQUENCE CONTROL MECHANISM

BACKGROUND OF THE INVENTION

1. FIELD OF THE INVENTION

This invention relates to spherical poppet valves, and more particularly to the type of valve wherein a spherical valve poppet is pivotably mounted within a spherical valve casing for rotation from a first axially in-line position with respect to an annular valve seat to a second valve open position at an angle thereto and outside of the axial flow path through the seat opening.

2. DESCRIPTION OF THE PRIOR ART

Spherical poppet valves of a sophisticated nature have evolved within the past few years wherein a cylindrical valve body includes a semi-spherical pocket outside of the axial flow path through the cylindrical valve body and a spherical valve poppet is pivotably mounted within the body for rotation from a first axially in-line position with respect to an annular valve seat adjacent the pocket to a second valve open position at an angle thereto with the valve poppet outside of the axial flow path through the seat opening. Spherical poppet valves of this general type form the subject matter of U.S. Pat. No. 3,675,894 issuing July 11, 1972, and copending application Ser. No. 448,439 filed Mar. 5, 1974, assigned to the common assignee. The spherical poppet valves are characterized by means which spring bias the spherical valve poppet into contact with the annular valve seat when in alignment therewith by a lateral or translation movement towards the seat opening along the axial flow path of the fluid passing through the valve housing or casing, under control of an eccentric. Shaft means are employed for effecting rotation of the valve poppet after retraction slightly from the valve seat, from a position axially aligned with respect to the valve seat to a rotated position at some angle thereto with the poppet positioned outside of the axial flow path and within the spherical pocket of the valve casing.

The spherical poppet valves referred to above have their sequence control mechanism exposed to the fluid being handled by the valve, and this prevents optimum lubrication of these parts. Attempts have been made to employ O-rings, seals or the like, but these are not compatible with all fluids, and rotating seals are not completely leak-tight. Therefore, leaks can damage the motors or may be otherwise dangerous, particularly where the valves are employed in sophisticated fluid systems. Irregular valve flow areas cause excessive pressure drop in critical applications, the irregular flow valve areas being partially created by the presence of the sequence control mechanism.

SUMMARY OF THE INVENTION

The improved flow control valve of the present invention utilizes a rotatable flow tube which provides a spring support for the spherical poppet and which, when opened, provides a smooth uninterrupted fluid flow for a minimum pressure drop through the valve with the rotatable flow tube being axially aligned with the inlet and outlet ends of the valve casing and shielding the flow through the valve from the control mechanism. An isolated sequence control mechanism drives the flow tube and its spherical valve poppet through metal bellows and racks and pinions to seal the sequence control mechanism from leakage of fluid carried by the valve.

Preferably, the flow tube has a cross sectional thickness which tapers such that the tube is thickest at the point where the valve poppet is mounted to the side of the tube and thinnest on the opposite side thereof. A first translation shaft intersects the flow tube, a second rotation shaft concentrically surrounds the first shaft and rotates independently of the first shaft. Aligned holes are formed within opposite sides of the tube, and the first shaft extends through the holes with eccentrics being formed on the first shaft coincident with the holes such that the two holes define follower means within the tube. The first shaft is rotated to effect translation and the second shaft rotated thereafter to effect rotation of the tube and poppet between the axially in-line position and a position to one side of the annular valve seat during cessation of rotation of the first shaft.

Independent rotation of the first translation shaft and the second rotation shaft involves the use of rack and pinion means including a slidable translation rack and a slidable rotation rack. A drive shaft mounted for rotation parallel to said concentric translation and rotation shafts is bidirectionally rotated by an electric motor, and pinion means associated with the racks are carried by the drive shaft and selectively coupled thereto to effect sequential rack movement. Two bars slidably mounted for movement in the direction of their longitudinal axis are coupled respectively to said translation and rotation racks, the bars include longitudinal recesses within the same and bar racks slidably mounted within the bar recesses and being of a length less than the length of the recess and being in mesh with a respective pinion means with hermetic sealing means interposed between the bars and the rotation and translation racks such that rotation of the drive shaft in either direction causes limited initial play between the bar racks and the bars prior to shifting of the bars and of the translation and rotation racks and subsequent rotation of the translation and rotation shafts. Spring biased plungers associated with the bars perform mechanical interlock functions and effect a change of state of control switches connected to the drive motor for automatically terminating drive motor energization and locking the spherical valve poppet in either valve open or valve closed condition as the spherical valve poppet reaches these positions, respectively.

A sequence control mechanism for effecting sequential rotation of the first and second pinion means includes a drive plate fixed to the drive shaft and rotatable therewith and translation and rotation plates rotatably mounted on the shaft on opposite sides of the drive plate with the translation and rotation plates carrying respective pinion means for rotation therewith. A drive pin fixed to the drive plate at the periphery thereof and rotatable therewith contacts radial projections on the periphery of the translation and rotation plates to drive those plates in sequence, pins fixed to the valve casing and positioned in the path of rotation of the radial projections of the translation and rotation plates limit the rotation thereof. Back-to-back spherical recesses formed within opposite sides of the drive plate and circular holes formed within the translation plate and the rotation plate at radial positions conforming to said spherical recesses cooperate with spring biased clutch balls carried within opposed bores formed within the sidewalls of the valve casing facing the translation plate, to effect a clutching action between the drive plate and the translation plate and the drive plate and the rotation plate respectively with transfer of clutching action occurring at the point where the spring biased plungers, said balls, and said circular holes within the translation plate and the rotation plate are in axial alignment.

DESCRIPTION OF THE PREFERRED EMBODIMENT

Figure 1:
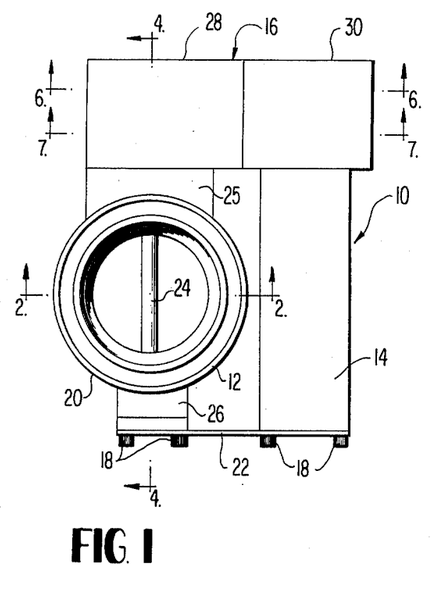
FIG. 1 is a rear, elevational view of an embodiment of the improved spherical poppet valve of the present invention, in valve open position.
Figure 2:
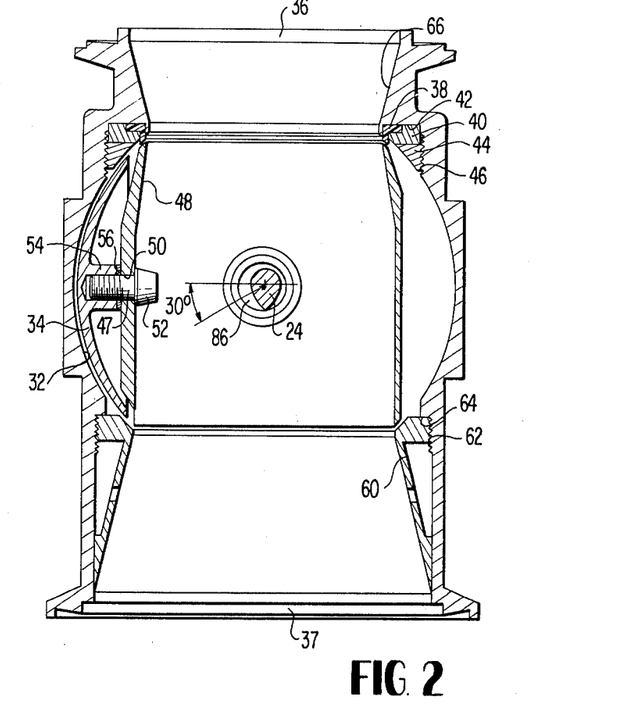
FIG. 2 is a sectional view of the spherical poppet valve of FIG. 1 taken about line 2—2.

Referring to the Figures, the improved spherical poppet valve of the present invention which constitutes and improvement over the spherical poppet valve of U.S. Pat. No. 3,675,894 and copending application Ser. No. 448,439 filed Mar. 5, 1974, and assigned to the common assignee, comprises a compact assembly indicated generally at 10, FIG. 1. The assembly comprises poppet valve 12, electrical drive motor, reducer and brake 14, and control switch assembly and sequence control mechanism 16. The poppet valve 12 consisting essentially of a cast metal or machined tubular valve casing or housing 20 to which the motor 14 is coupled by way of a motor support bracket 22 and bolts 18, the axis of the motor 14 being essentially parallel to the axis of a shaft 24 which supports the valve poppet for rotation and translation within cylindrical casing 20. Upper and lower bearing housings 25 and 26, respectively, are interposed between the cylindrical valve casing 20 and the sequence control mechanism housed within a housing section 28. The bearing housing 26 supports one end of the motor support bracket 22 and is fixed to the bottom of the cylindrical valve casing or housing 20. Motor 14 terminates at its upper end in a housing section 30 which holds the control switch assembly and sequence control mechanism and mechanically connects the output shaft 108 of the drive motor 14 to the spherical valve poppet shafts 24 and 70 by way of the sequence control mechanism. In some respects, the spherical poppet valve 12 of the present invention is similar to that of the referred to U.S. Pat. 3,675,894 and application Ser. No. 448,439, to the extent that the sidewall of the valve casing 20 is provided with a spherical pocket 32 which receives a spherical valve poppet 34 such that the poppet 34 may be positioned completely out of the flow path of the fluid which flows through the valve 12 from its inlet end 36 to its outlet end 37. Further, the valve casing 20 is provided with an annular valve seat 38 formed by a resilient plastic material such as Teflon or the like in the shape of a ring of L-shaped cross section backed by an interfitting L-shaped metal ring 40 which is, in turn, forced against shoulder 42 of casing 20 by a metal locking ring 44, this ring being threadably coupled at 46 to the metal valve casing 20.

Contrary to the referred to patent and application, and forming an important element of the present invention is the fact that the valve poppet 34 is not mounted to a bridge, but is center supported by way of a threaded pin 47 to the side of a specially configured and formed flow tube 48 whose length is generally equal to the diameter of the valve poppet 34. Essentially, a circular hole 50 is formed within the flow tube 48 at a position in line with the axis of the shaft 24 which extends through the flow tube at right angles to the flow path as defined by the casing 20, the pin 47 having a headed end 52 which abuts the inside of the tube, and the threaded end of the pin 47 is threadably received by an annular projection 54 extending radially inward of the dish-shaped spherical poppet 34. A washer 56 surrounds the pin 47 and is sandwiched between the end of the annular projection 54 and the outer wall of the flow tube 48. The poppet is thus mounted on the side of the flow tube which doubles as a spring loading element for the poppet in place of the usual spring bridge by being slightly radially compressed during translation of said tube and valve poppet to poppet fully closed position. Further, the tube 48 has its thickness varying transversely of its axis, tapering from maximum thickness at the point of poppet attachment, uniformly toward the side opposite pin 47. This permits balanced loading of the bearings carried thereby and interposed between the tube and the tube support shaft 24. The cylindrical valve casing 20 is further provided with a threaded annular flow guide 60 at the downstream end of the flow tube 48 which is threaded to the casing 20 at 62 and abuts a shoulder 64. It defines a diverging discharge area for the valve, while the casing 20 is provided with a converging surface portion 66 at its inlet end 36.

The flow tube 48 which replaces the bridge acts therefore in conjunction with the convergent inlet surface 66 and the divergent outlet throat as formed by member 60 and the air foil shaped shaft 24 which extends through the tube and across the flow path to provide a smooth, unimpeded flow path of modified venturi form. The pressure drop through the open valve will be much less than that of the prior valves and, advantagously, this design eliminates the possibility of cavitation during such flow. The retraction and rotation concept of the translatable and rotational valve poppet 34 is similar to that of U.S. Pat. No. 3,675,894 and application Ser. No. 448,489, but the employment of the flow tube 48 as a support for the valve poppet 34 allows the use of an eccentric with very short throw to achieve the required translation or movement after rotation of the valve poppet to an axial in-line position with respect to the valve seat, axially towards or away from the valve seat, this movement being more readily seen by contrasting FIGS. 5b and 5c. Further, poppet loading is programmed to occur when the eccentric offset is approximately at right angles to the direction of poppet motion, and by this means the links and guides which are employed in the mechanism associated with the valve of No. Pat. 3,675,894 are eliminated, the eccentric is not overcentered to lock the valve in closed position, and this construction, particularly in smaller size valves, is therefore greatly simplified.

Figure 3:
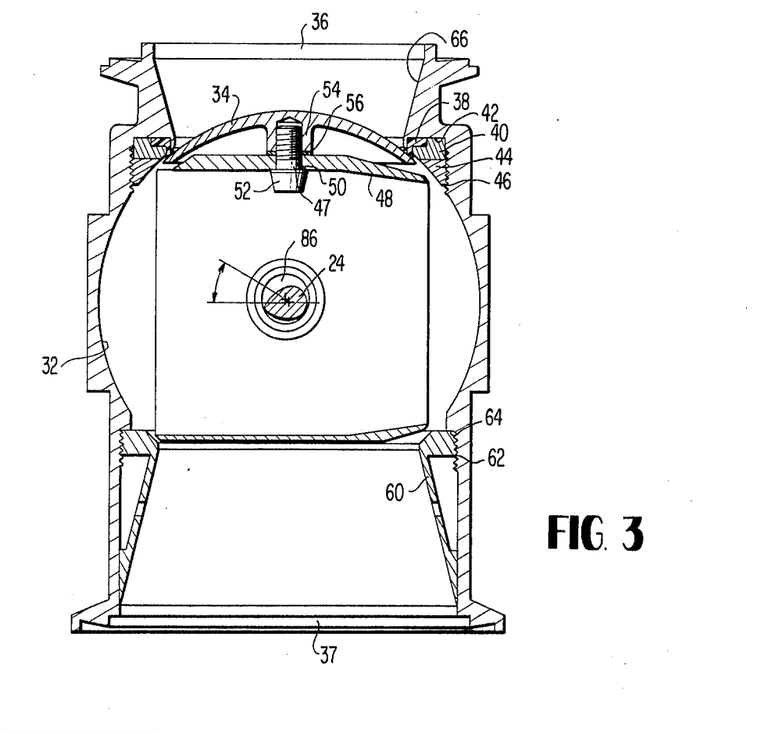
FIG. 3 is a sectional view similar to that of FIG. 2 with the valve poppet in closed position.

FIG. 3 contrasts the fully closed and fully open positions of both the spherical poppet and the flow tube after effecting the desired rotational movement of the tube and valve poppet combination and the translation of the same axially to slightly shift the tube and poppet longitudinally relative to the axis of flow through the valve casing 20 to seat the periphery of the spherical valve poppet 34 on the annular Teflon valve seat 38.

Figure 4:
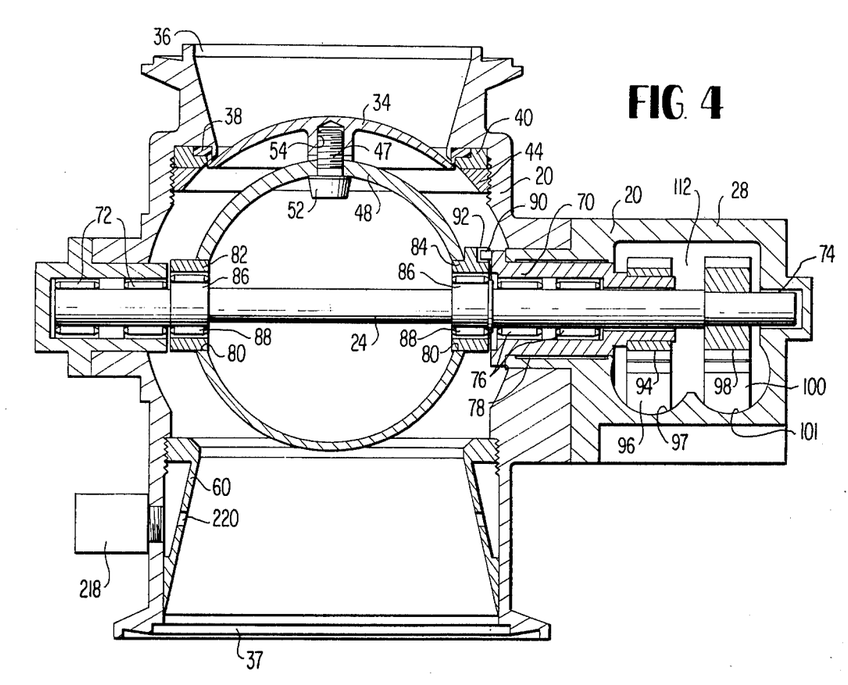
FIG. 4 is a sectional view of the spherical poppet valve of FIG. 1 taken about line 4—4.
Figure 5A:
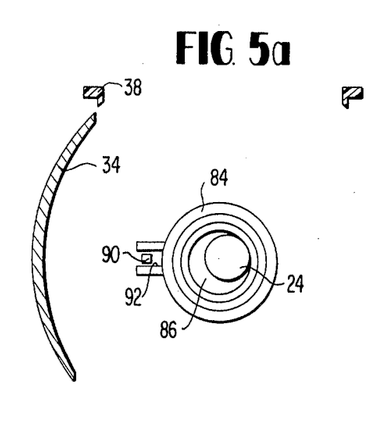
FIGS. 5a through 5c are schematic views of portions of the spherical poppet valve illustrated in FIGS. 1 through 4 showing the sequence of poppet movement from full valve open position to full valve closed position.
Figure 5B:
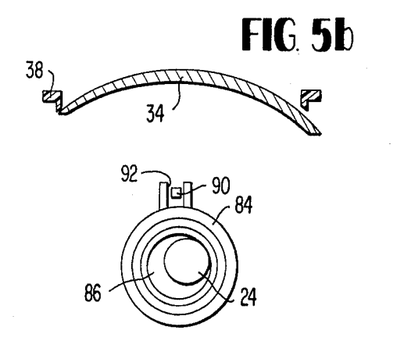
Figure 5C:
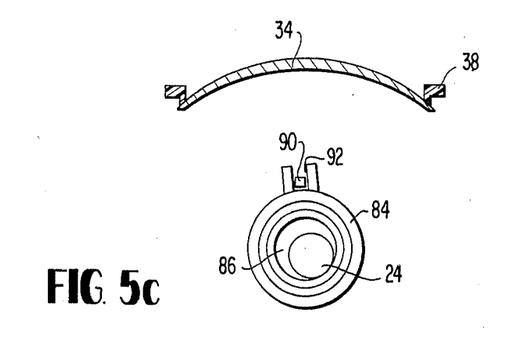

With respect to the nature of effecting the sequence of operations as seen in FIGS. 5a through 5c inclusive, reference will be made to these figures and FIG. 4, illustrating the mechanism for effecting both the rotational and translational movement of the spherical valve poppet 34, however, for a full understanding of the nature of this movement, its sequence and the mechanism for achieving that movement, reference may be had to copending application Ser. No. 448,439. In this regard, shaft 24 comprises the poppet translation shaft and concentrically carries a rotation shaft 70. For the purposes of this application, it is necessary only to note that shaft 24 is mounted at respective ends within valve casing 20 by suitable bearings such as roller bearings 72 at the left, FIG. 4, and sleeve bearings 74 at the right. The rotation shaft 70 is mounted for rotation on the translation shaft 24 by roller or needle bearings 76. Sleeve bearing 78 permits the rotation shaft 70 to rotate relative to housing 20 and the sequence control mechanism housing 28 fixed thereto on the right side of the assembly, FIG. 4.

Important to the present invention is the fact that the bridge and the torsion spring of the above identified application Ser. No. 448,439 has been replaced by the flow tube 48, the flow tube carrying rings acting as cam followers. The flow tube 48 is mounted on the shaft 24 by way of a pair of rings 82 and 84 which are fixed on their outer peripheries to the flow tube 48 by being received within appropriate openings 80 which are aligned on opposite sides of the tube and through which shaft 24 extends, the shaft 24 in turn being formed with appropriate eccentrics or cams 86 in the form of radially enlarged portions. The rings 82 and 84 act as cam followers, riding on roller or needle bearings 88. Thus, with the shaft 24 stationary relative to the tube 48, the tube 48 rotates between positions where the valve poppet 34 is axially aligned with the valve seat 38 and where the flow tube 48 is aligned with that valve seat and the valve poppet 34 is received within the pocket 32 of the valve casing 20 and out of the flow path, FIG. 3. However, with the shaft 70 fixed, the rotation of shaft 24 and eccentrics 86 causes rings 82 and 84 acting as cam followers relative to the eccentrics 86 of the shaft 24, and the valve poppet to translate axially towards and away from the valve seat 38 to effect, after rotation from valve open position, the closing of the valve on the valve seat 38 by an axially inline movement with respect to the flow path through the cylindrical valve casing 20.

This is achieved in the manner of the referred to application by providing a valve rotating lug 90 as a projection on the end of the rotation shaft 70 facing ring 84 which lug is received within a recessed portion 92 of the ring. Thus, when the rotation shaft 70 ceases rotation, the shaft 24 drives the tube 48 to valve seating position. The recess 92 is in abutment with lug 90. The termination of the rotation of shaft 70 occurs at the point where the valve poppet 34 is axially in-line with the annular valve seat 38. The rotation of shaft 70 ceases. Sequentially, rotation of the translation shaft 24 then effects relative translation of the rings 82 and 84 on the eccentrics 86 and shifting of the valve poppet 34 from an axial in-line but slightly spaced position relative to the annular valve seat to a fully closed position in sequence as shown by FIGS. 5b and 5c.

These actions are achieved in sequence through the use of two rack and pinion mechanisms carried by casing or housing section 28. The rotation shaft 70 extends only along a portion of the translation shaft 24 and terminates in a fixedly mounted pinion 94 which is in mesh with a rotation rack 96 mounted for movement at right angles to the axis of the rotation shaft 70 by curved slideway 97. The coaxial translation shaft 24 carries, to the right of the rotation shaft 70, FIG. 4, pinion 98 which in turn is in mesh with a translation rack 100 which is slidably mounted within casing 28 beneath the pinion 98 by way of slideway 101, FIG. 7. Both racks 96 and 100 are slidably mounted on their slideways by way of Rulon slide bearings 104, FIGS. 6 and 7, the racks being moved laterally from left to right and vice versa to effect rotation of shafts 24 and 70 respectively. The racks 96 and 100 are mounted for movement in a direction of their longitudinal axis and restrained from lateral movement by the curved slideways.

In the illustrated embodiment, the translation shaft 24 and the rotation shaft 70 are driven from a drive input shaft 108 protruding within a motor control compartment 110 within casing section 30 which is heremetically sealed from the valve shaft compartment 112 formed by casing section 28. Casing section 30 rotatably mounts the drive shaft 108 by bearings 254, FIG. 9, the shaft 108 being essentially parallel to shafts 24 and 70 and laterally spaced therefrom. Shaft 108 rotatably supports a pinion 114 which is in mesh with a bar rack 116, FIG. 6. Bar rack 116 is slidably received within a rectangular recess 118 of a rectangular, metal bar 120 which slides laterally within casing recess 123 along a path of movement parallel to the movement of rack 100 to which it is connected by means of a connecting rod 122. The recess 123 within which the bar 118 is slidably mounted is open at its left end, FIG. 6, and receives a projecting portion 124 of the sidewall 126 of casing section 28. This sidewall 126 is provided with an opening 128 through which the shaft 122 freely projects in connecting rack 100 to the bar 120. A tubular metal bellows 130 is fixed at one end 132 to the wall 126 within compartment 112 and fixed at the other end to the rack 100, the bellows surrounding the connecting rod 122 and forming a hermetic seal separating compartment 110 from compartment 112.

The control mechanism for the improved spherical poppet valve of the present invention has been designed to provide unlimited life, complete freedom from leakage of propellants into the fluids controlled by the valve 12 into the motor area or outside the valve. The metal bellows therefore provides a movable, hermetic seal between the two compartments. All external joints in the shaft compartment 112 are sealed with metallic seals (not shown) with no dynamic seals to the exterior. On the motor side, that is, compartment 110, dynamic seals are required only on the plungers of the position indicating switches, these seals (not shown) comprising O-rings compatible with the lubricant used in the motor/control area. Static O-rings (not shown) of low permeability are employed to seal all other external joints.

In similar fashion, rack 96 is fixedly coupled to a second bar 136 which is slidably mounted within casing section 30 to the side of bar 120. Connecting rod 138 is threadably coupled to the left hand end of the bar 136 at 140 and a tubular metal bellows 142 is fixedly attached at 144 to the sidewall 126 of casing section 28, while its opposite end is fixed to the side of the rack 96 in the same manner as bellows 130. Opening 148 within sidewall 126 permits the rod 138 to pass therethrough, the bar 136 being mounted within recess 123 of the casing section 30. The bar 136 bears a recess 152 corresponding to recess 118 of bar 120 and receives a laterally movable bar rack 150 whose length is somewhat less than the recess 152 carrying the same. The bar rack 150 is in mesh with a pinion 154 which is rotatably mounted on the motor shaft 108 in the same manner as the pinion 114 but is axially displaced from that pinion. The shaft 108 constitutes the output or drive shaft of the drive motor 14, the pinions 114 and 154 being in constant mesh with bar racks 116 and 150 respectively. The electric motor 14 is driven bidirectionally to achieve the desired opening and closing of the valve poppet 34.

Figures 6, 6A, 7, 7A, 8:
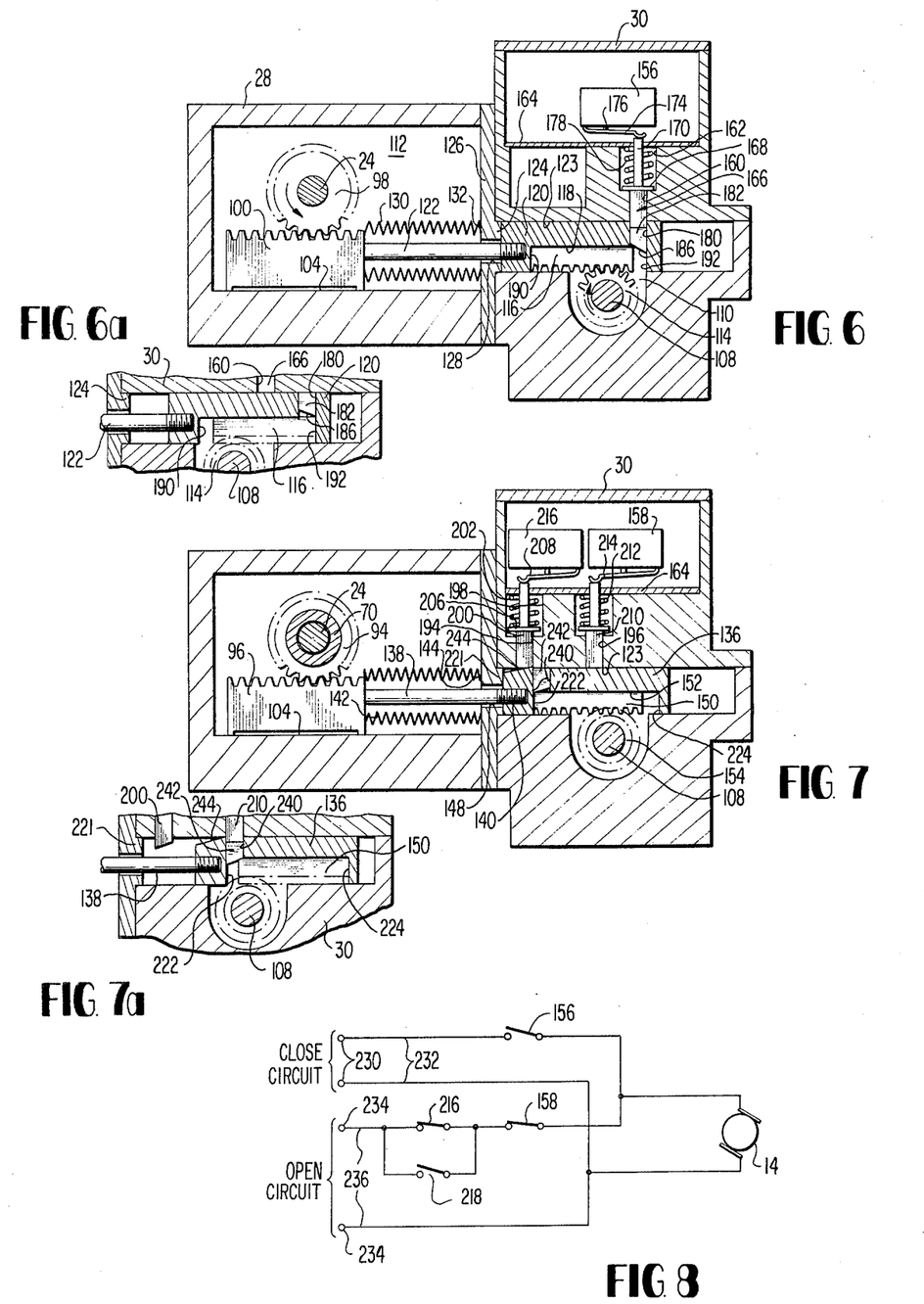
FIG. 6 is a sectional view of the interlock mechanism between the drive motor and the spherical poppet rotation and translation mechanism under valve closed conditions.
FIG. 6a is a fragmentary sectional view of a portion of the mechanism shown in FIG. 6 at the termination of the spherical poppet translation movement away from the valve seat.
FIG. 7 is a sectional view of the portion of the mechanism shown in FIG. 6 with the valve poppet rotated to an in-line position with respect to the valve seat but spaced axially therefrom.
FIG. 7a is a sectional view of a portion of the mechanism shown in FIG. 7 at full valve open position.
FIG. 8 is an electrical schematic diagram of the drive motor and control switches for the valve of FIG. 1, under closed valve conditions.

In the control circuit, FIG. 8, a set of switches comprising a pair of position control switches, are employed, the valve closed switch being shown at 156 and the valve open switch at 158. These switches comprise conventional plunger actuated switches. In this respect, the casing section 30 is provided with a vertical bore 160 which faces bar 120 and overlies the same, the bore 160 being counterbored at 162 and covered by a horizontal cover or plate 164. A cylindrical plunger indicated generally at 166 has a lower portion of a diameter on the order of bore 160 carried thereby and includes, intermediate of its ends, an enlarged diameter portion 168 which is of a diameter slightly less than counterbore 162 and is carried therein. The plunger terminates at its upper end in a reduced diameter portion 170 which projects through an opening within cover 164 and abuts a switch actuator or spring member 174. The spring member 174 is cantilever mounted with its free or outboard end bearing against the end of the plunger 166, the switch 156 being a normally open switch and carrying in turn a button 176 which projects outwardly of its casing and controls the condition of the switch contacts within the switch itself. A coil spring 178, concentrically surrounding the reduced diameter section 170 of the plunger, biases the plunger 166 downwardly since the spring is compressed between the cover 164 and the enlarged diameter portion 168 of that plunger, toward switch open position. The bar 120 is provided with a vertical, cylindrical hole or bore 180 which is of the same diameter as bore 160 and which permits the plunger 166 to project therein under the bias of spring 178 when the bar is positioned such that the bores 180 and 160 coincide. The bore 180 extends from the upper surface of the bar to the recess 118 and the bore 180 receives a cylindrical pin 182 which acts as an extension to the plunger 166, the pin 182 having a horizontal upper end and a tapered or inclined lower end 186. The length of the pin 186 is essentially the depth of the bore 180. The effect of this may be seen by reference to FIG. 6a in comparison to that of FIG. 6, which represents two conditions, FIG. 6 being the condition where the valve is in full closed position, the bar 120 having been driven, its maximum extent to the left as result of energization of the drive motor 14, and the motor 14 is automatically deenergized by opening of switch contacts of switch 156. This fact is indicated by a change in state of the switch 156, this resulting in the compression spring 178 having forced the plunger 166 to its fully depressed position to the extent of forcing the pin or plunger extension 182 to partially protrude from the bore 180 with its tapered end 186 resting on the right hand end of the rack bar 116. Because the recess 118 within the bar 120 is longer than the bar rack 116, there is limited play or freedom of movement of the bar rack 116 relative to the bar 120 prior to driving the bar either left or right by the ends of the bar rack 116 impinging upon the ends 190 and 192 of the recess. In the position shown in FIG. 6, the bar rack 116 is driven to its extreme left hand position where the bar 120 abuts the projection 124 of the sidewall 126 of casing section 28.

Further reference to FIG. 7, shows that the casing section 30 is provided with vertical bores 194 and 196 which open to the recess 123 carrying the bar 136, and face the upper surface of that bar. Bore 194 is counterbored at 198 and carries a plunger 200 which is identical in form and configuration to plunger 166, this plunger being spring biased by spring 202 positioned within counterbore 198 and compressed between the cover 164 and an enlarged diameter portion 206 of the plunger 200. Delay switch 216 is a normally open switch and has its actuator 208 abutting the upper end of the plunger 200 and is responsive to plunger movement to change its state from closed contact condition to a normally open contact condition depending upon the position of bar 136. The bore 196 receives a plunger 210 which is spring biased downwardly by coil spring 212, the upper end of the plunger 210 being in contact with an actuator 214 of valve open control switch 158 whose contacts are normally open. The poppet valve 12 is further provided with a pressure switch 218 which is physically located on the cylindrical valve casing 20, FIG. 4, on the outlet side of the valve and, in this case, the annular flow guide member 60 is provided with an opening 220 through which the fluid passing through the valve may penetrate to permit the fluid pressure to act on the switch 218.

All four switches are shown in the electrical schematic drawing of FIG. 8, the pressure switch being a normally open switch but responsive to valve open condition and flow through the casing 20 to close the normally open switch contacts.

The bar 136 is mounted for sliding movement to the left and right within the recess 123, its left end being in abutment with projection 221 of the sidewally 126 when it is driven in that direction to its extreme limit. Further, the recess 152 housing the bar rack 150 being longer than the bar rack 150 permits limited play or free movement of the bar rack 150 prior to contact with the bar 136 and driving the same in response to energization of the motor 14. In this respect, the recess 152 is formed with ends 222 at the left and 224 at the right, and in FIG. 7 the bar rack 150 is shown as abutting end 222 which occurs during movement of the bar from right to left.

The sequence of operation may be readily seen in viewing FIGS. 6, 6a, 7 and 7a. In FIG. 6, the valve is in full closed position, the plunger 166 having its lower end under the pressure of biasing spring 178 projected into the bore 180 of the bar after the bar 120 is moved to its extreme left hand position under counterclockwise rotation of motor shaft 108. The switch 156 is a normally open switch and in response to shifting of the bar 120 from right to left, the depression of the plunger 160 acts to open the closed contacts of switch 156, and this acts to deenergize the drive motor.

Reference may be had to FIG. 8 which shows the positioning of the switches 156, 158, 216, and 218 in the circuit.

Assuming that the valve is in the fully closed condition as shown in FIGS. 3, 4, 5c, 6, 7, 8 and 12, upon the initial energization of the drive motor 14 by applying power via terminals 234 to lines 236 to effect a valve open condition, the output or drive shaft 108 of the motor 148 starts to rotate clockwise, FIG. 6 as shown by the arrow. Since the bar rack 116 is in its full left position and abutting end 190 of the recess 118, the bar rack 116 will have to move into contact with the end 192 of the recess prior to driving the bar 120 to the right. However, since the right hand end of the bar rack 116 (which is in direct mesh with the pinion 114) abuts the inclined end 186 of pin or plunger extension 182, the plunger 166 is first moved upwardly to the extent that the abutting ends of plunger 166 and pin 182 are flush with the upper surface of the bar 120, this has the effect of closing the normally open switch contacts of switch 156 within close circuit lines 232. The bar is previously interlocked by the presence of the lower end of plunger 166 within bore 180. The bar 120 then moves to the right being driven in that direction by the clockwise rotation of shaft 108 as seen in FIG. 6a, in turn the connecting rod 122 which connects the bar 120 to rack 100 shifts the rack to the right and rotates pinion 98 and valve translation shaft 24 counterclockwise, FIG. 6, at the same time compressing the bellows 130. Upon termination of rotation of translation shaft 24, rotation of shaft 70 occurs to completely open the valve.

The bar 136 is provided with a vertical bore 240 which is of the same diameter as bore 194 within casing section 30, the bore 240 carrying a cylindrical pin 242 of identical size and configuration to pin 182 and similarly operable with respect to bar rack 150. The plunger 200 within bore 194 terminates in an inclined lower end face which mates with an inclined surface 244 on the top of bar 136 adjacent its left hand end such that when the bar 136 is in its extreme left hand position, FIG. 7, the inclined surface 244 forces the plunger 210 to move upwardly against the bias of spring 212 and to open the normally closed contacts of delay switch 216.

With the valve in the fully closed position, the bar 136 is at its extreme left hand position as shown in FIG. 7, the bore 240 is not in alignment with bore 196 and the pin 242 has its lower inclined end face in contact with the end of the bar rack 150 which abuts end 222 of the recess 152. Upon continued rotation of shaft 108 clockwise, the bar rack 150 moves away from end 222 and into contact with the right hand end 224 of recess 152 to drive the bar 136 to the right, after an initial time delay. This movement has no initial effect on the bar 136, but the bar then moves to the right, from the extreme left position shown in FIG. 7 to the extreme right position shown in FIG. 7a. After some movement of the bar 136, the compression spring 202 forces the plunger 200 downwardly to the extent where normally closed contacts of delay switch 216 open. The motor then stops, allowing a slow fill of the line to eliminate "water hammer" until the pressure in the line and valve actuates pressure switch 218 and restarts the motor. The bar 136 then moves to the point where bores 196 within the casing section 30 and 240 within the bar coincide, at which point the coil compression spring 212 presses the plunger 210 downwardly which in turn forces the pin 242 to project into contact with the left hand end of the rack 150 which has moved away from recess end 222, the depression of the plunger 210 to that extent acting to mechanically lock the valve in full open position and to change the state of the valve open control switch 158 causing the normally closed contacts of that switch to open, terminating energization of motor 14 through leads 236. During the opening, it is assumed that flow proceeds from the inlet 36 through the outlet 37 and the fluid pressure within the divergent portion of the valve acts on the fluid pressure switch 218 to close its normally open contacts and close the valve open motor circuit and continue the opening of the valve to full open with power input to terminals 234. Terminals 230, FIG. 8, associated with leads 232, input valve closed power only when required to reclose the valve.

Thus, the motor 14 is subsequently energized to drive the shaft 108 in the opposite direction and to reverse the sequence of operation described above by energizing lines 232 by applying power to terminals 230. In this respect, reference to FIG. 7a indicates that the mechanical interlock plunger 210 must be removed to permit the valve to shift from full open to full closed position by first effecting relative movement between the bar rack 150 and bar 136 to lift the pin 242 to the extent where the interface between that pin and the plunger 200 is flush with the upper surface of bar 136, releasing the same and permitting the bar rack 150 to drive the bar when its left hand end abuts end 222 of the recess to rotate the spherical valve poppet 34 out of the spherical pocket of the valve casing 20 into a position where it is in alignment with the annular valve seat 38 and translate it into valve fully closed condition with the control mechanism and drive mechanism taking the position shown in FIG. 6.

Reference to FIGS. 9 through 12 inclusive shows the sequence control mechanism 250 in the form of a clutch type drive for effecting in sequence, shifting of the translation rack and rotation rack by sequential rotation of meshed pinions.

Figures 9, 9A, 10, 11, 12:
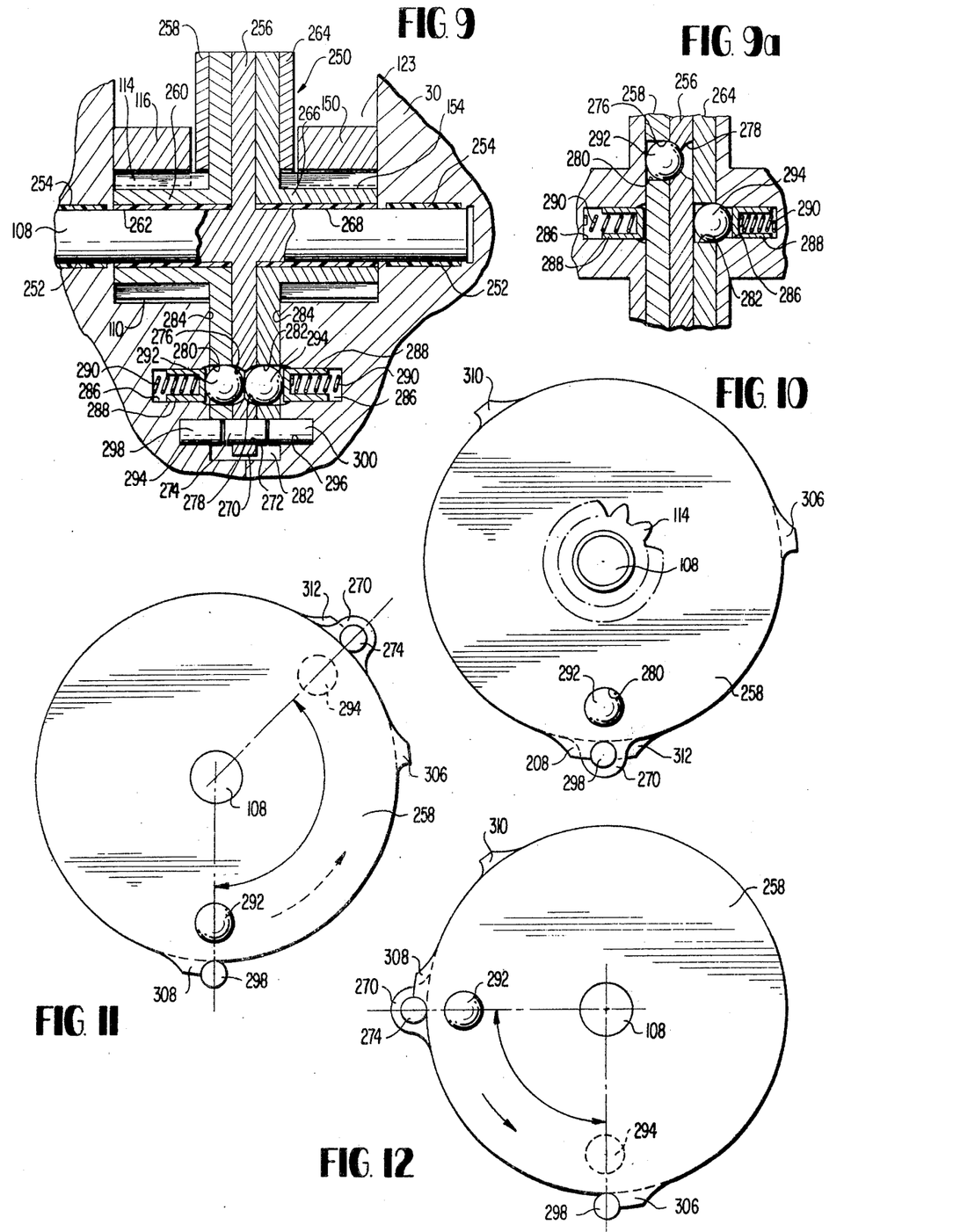
FIG. 9 is a sectional view of the sequence control mechanism for the spherical valve poppet, at transfer position.
FIG. 9a is a sectional view a portion of the mechanism of FIG. 9 with the translation plate locked to the drive plate.
FIG. 10 is an axial end view of the mechanism of FIG. 9 from the left end thereof at mechanism transfer position.
FIG. 11 is a similar end view to that of FIG. 10 at valve open position.
FIG. 12 is a similar end view to that of FIGS. 10 and 11 at the time the spherical valve poppet is in fully closed position.

In order to effect rotation of pinion 114 for the bar rack 116 and pinion 154 for the bar rack 150, the shaft 108 mounts the sequence control mechanism indicated generally at 250 in FIG. 9. In this respect, the housing section 30 is provided with a pair of opposed bores 252 on opposite sides of the recess 123, bores 252 receiving Teflon sleeve bearings 254 within which rotates the end of motor shaft 108 projecting from motor 114. The sequence control mechanism 250 comprises essentially a clutch assembly including a central circular drive plate 256 which is affixed to and rotates with motor drive shaft 108. To the left of the drive plate 256 in FIG. 9, is a circular translation plate 258 which includes an annular flange portion 260 which is rotatably mounted on shaft 208, rotating about the shaft on a Teflon bearing 262. To the right of the drive plate 256 is a circular rotation plate 264 which is also provided with an integral flange 266 permitting it to be mounted for rotation on shaft 108 to the side of the drive plate 256 and separated from the drive plate by a sleeve bearing 268 formed of Teflon. Pinion 114 is integral with and forms a portion of the flange 260 of the translation plate 258 while pinion 154 is integral with and forms a portion of the flange 266 of the rotation plate 264. Bar racks 116 and 150 are slidably mounted within recess 123 which defines trackways for these members such that rotation of their pinions causes the bar racks to shift in the direction of their longitudinal axis driven by the intermeshed teeth between the pinions and the bar racks.

The drive plate 256 is provided with a radial projection 270 having a circular opening 272 parallel to the axis of shaft 108, which opening carries a fixed drive pin 274 whose length is in excess of the thickness of the drive plate 256 such that both ends of the drive pin 274 project outwardly from the sides of the drive plate 256. The circular drive plate carries back to back, left and right spherical pockets 276 and 278 which respectively face translation plate 258 and the rotation plate 264. The translation plate 258 which is of the same diameter and essentially the same thickness as the drive plate 256, carries a circular hole 280 which is of a diameter on the order of a diameter of the recess 276 at the surface of the drive plate 256, rotation plate 264 carrying a similar hole 282. Compartment 110 of casing section 30 is formed with a depressed portion 282 of a width which permits the three plates 256, 258 and 264 to be received therein. Opposed walls 284 of the casing section 30 which define the recess 282 carry alignment bores 286 which receive hollow plungers 288 which are spring biased by compression coil springs 290 such that the plungers press outwardly of the holes 286 against balls 292, 294 which act as clutch members for the sequence control mechanism, the balls 292 and 294 being partially received respectively within recesses 276 and 278 on opposite sides of the drive plate 256. Further, within the walls 285 are provided aligned cylindrical holes 294, 296 which holes fixedly carry stop pins 298 and 300 on opposite sides of the drive plate 256. The pins project within the recess 282 to the extent that they almost touch the drive pin 274 when the drive plate 256 rotates to a transfer position wherein the pins 298, 274 and 300 are in axial alignment. Further, the translation plate 258 is provided with a translation plate stop 306 in the form of a radial projection on its periphery at a position 90° circumferentailly spaced from the position of the ball receiving hole 280, and a second stop 308, circumferentially adjacent hole 280. Rotation plate 264 carries circumferentially spaced radial projections or stops 310 and 312.

With FIG. 10 as a reference, which corresponds to transfer position for the sequence control mechanism 250, the opening 280 is shown as carrying ball 292 partially received within recess 276 of drive plate 256, but the major portion in received within the opening 280. At the same time, the drive pin 274 is in abutment with the translation plate stop 308 and rotation plate stop 312. A second rotation stop 310 comprises a radial projection 135° circumferentially spaced from stop 312. This permits rotation of the translation plate 258 driven by drive plate 256 only 90° between the limits defined by the translation plate stops 306 and 308 which impinge the fixed stop pin 298 carried by housing section 30. Likewise rotation of rotation plate 264 is limited to 135° by stops 310 and 312 which selectively impinge pin 300. Thus, drive pin 274 carried by the drive plate 256 can cause the translation plate to rotate only 90° as it shifts clockwise from the transfer position at the bottom of its path of rotation to an angular position 90° therefrom as seen in FIG. 12, and vice versa.

As the drive plate drives the translation 258 90° to the transfer position shown in FIGS. 9 and 10 from that shown in FIG. 12, transfer takes place which causes the drive plate 256 to sequentially drive the rotation plate 264 through 135° to the position shown by the dotted line displaced ball 294, FIG. 11, at which point, the stop 310 on the rotation plate impacts the fixed pin 300. The valve is then in full open position. Rotation in the opposite direction to the point where ball 294 aligns with ball 292 at the transfer position results in stop 312 of the rotation plate impacting the opposite side of the fixed pin 300 and constitutes the first step in the sequence towards valve closed position.

The illustrated embodiment of the present invention may be best understood by an explanation of the sequence of events in movement of the valve from full closed position to full open position, and a reversal of the valve or shifting from a fully open position to a fully closed position. In this respect, reference to the drawings shows the valve fully closed in FIGS. 3, 4 and 5c, and segments of the mechanism under this condition in FIGS. 6, 7 and 12. With the valve fully closed, the translation plate 258 has rotated to the position shown in FIG. 12 with its stop 306 abutting fixed pin 298 within casing 30 and ball 292 received within spherical recess 276 of drive plate 256 and partially carried within circular opening 280 within the translation plate. The motor is energized through leads 236 to rotate the shaft counterclockwise, FIG. 12, driving the translation plate 258 by way of the ball clutch mechanism including ball 292 through 90° of shaft rotation, this counterclockwise rotation, FIG. 12, causing pinion 114 to rotate with the shaft and shift the bar rack 116 from left to right, that is, the sequence of FIG. 6 to FIG. 6a. In doing this, the right hand edge of the bar rack 116 drives the inclined end 186 of pin 182 upwardly to unlock bar 120 before any movement of the bar and further to open the contacts of the valve close control switch 156. Movement of the bar rack 116 is independent of movement of the bar rack 150, and since the clutch between drive plate 256 and rotation plate 264 is declutched at this moment, the bar 120 moves from left to right without any corresponding movement of bar 136. In turn, rack 100 in mesh with pinion 98 carried by translation shaft 24 drives rings 82 and 84 on bearings 88 camming the valve poppet 34 rearwardly, that is, backing it off relative to the annular valve seat 38 in an axially in-line direction. The eccentric offset is purposely set to be very short, .031 inch in a practical version of the present invention, and the lateral displacement during the pressure release or pressure clamping portion of the translation stroke is very small, only .04 inch with uniform seating and unseating occurring. Further, the adjustable center mount between the poppet and the tube allows the poppet to be secured in proper seating position after the seating load is applied, avoiding the problem of possible offset loading. The 0.031 inch eccentric offset also minimizes the power required to close under all conditions, including full flow. Thirty inch pounds of torque will suffice to seal the valve for a zero leak test at a proof pressure of 250 psi, and only 18 inch pounds is required to close the valve against the maximum pressure of 166 psi at full flow. The valve close control switch 156 has its normally open contacts closed for the full extent of travel of bar 120 and translation rack 104 from valve full closed position of the poppet 34 to its axially retracted position with respect to valve seat 38 and to a position permitting rotation of the flow tube 48 and the valve poppet 34. FIG. 6a shows the extent of longitudinal movement of the bar 120 driven to the right by bar rack 116 and the corresponding movement of translation rack 100, this movement of translation rack 100 corresponding to a rotation of translation shaft 24 approximately 60° as a result of rotation of the drive shaft 108 of the motor and the drive plate 256, 90° as shown in FIG. 12. At this point, the clutch mechanism transfers drive from the translation plate 258 to the rotation plate 264, the two balls 292 and 294 being in circumferential alignment, opposed and projecting partially within the back-to-back spherical recesses 276 and 278 respectively. Further, the balls 292 and 294 are in alignment with and being pressed by respective plungers 288 on their opposite sides. Continued counterclockwise rotation of the shaft 108 and the drive plate 256 causes the drive pin 274 to impinge against the stop 312 of the rotation plate 264, causing the rotation plate to rotate with the drive plate as shaft 108 continues to rotate, the ball 292 being cammed out of spherical recess 276 while the ball 294 is carried by its recess 278 within drive plate and the circular hole 282 within the rotation plate 264. Drive plate 256 is unlocked from translation plate 258 and locked to rotation plate 264. This counterclockwise rotation continues for 135° rotation of shaft 108 as seen in FIG. 11 until stop 310 abuts against stop pin 300 stopping the rotation of plates 256 and 264 which are clutched together by way of ball 294, the ball 294 having shifted to the dotted line position shown in FIG. 11. This action results in shifting of bar rack 150 from left to right, away from end 222 of recess 152, the initial movement of the bar rack 150 being relatively free with the play occurring until the right hand end of the bar rack 150 abuts end 224 of the recess of bar 136. The initial movement of the bar 136 from left to right causes the inclined face 244 of bar 136 to move away from the plunger 200, the plunger descends under the bias of spring 202 and the normally open delay contacts open. As the bar 136 moves from left to right, the rotation rack 96, in mesh with pinion 98 of the rotation shaft 70 of the valve, causes shaft 70 to rotate through 90° rotating the flow tube 48 to an in-line position relative to the axis of the valve casing 20 and rotating the spherical poppet 34 into the spherical pocket 32 within the sidewall of casing 20. Again, it is noted that the drive plate 256 rotates the rotation plate 264 approximately 135° which rotation is translated into rotation of shaft 70 only to the extent of 90° to permit the valve to rotate to a position out of the path and hidden from the flow of fluid through the valve casing.

While the valve employs a one and one-half ratio between the rotation of the control mechanism and the rotation of the translation and drive shaft for the valve poppet, the position of the projection stops on the peripheries of the plates 258 and 264 may be varied to provide a one to one ratio or other appropriate ratios. By reference to FIG. 7a, it is noted that plunger 210 associated with the valve open control switch 158 prior to movement of the bar 136 from left to right, presses on the actuator 214 to maintain the normally open switch contacts closed. However, at the end of the bar movement 136 from left to right, switch 158 is opened to stop the motor. The bar rack 150 moves into abutment with end 224 of the bar recess 152 and the plunger under the bias of spring 212 is further depressed forcing pin 242 to move downwardly and positively locking the bar 136 in valve open position. It is at that time that the normally open contacts of valve open control switch 158 open and a circuit is completed through delay switch 216. As the valve opens, the fluid pressure sensed by the pressure switch 218 closes those normally open contacts. The normally open contacts of delay switch 216 open but the circuit is maintained through the pressure switch 218.

The closing of the valve occurs as result of a reversal in sequence of operations. When stop 310 abuts pin 300, drive to the motor 14 terminates, and the clutch mechanism is essentially that shown in FIG. 11 prior to driving the valve towards valve closed position. Upon reenergization of the motor 14 by applying power to terminals 230 to drive the motor 14 in the opposite direction and to rotate shaft 108 counterclockwise, FIGS. 10, 11 and 12, the clutch action by ball 294 between rotation plate 264 and drive plate 256 causes the rotation plate to follow the drive plate 256 as it rotates clockwise from the position below in FIG. 11 to the clutch transfer position shown in FIG. 10 where the balls 292 and 294 opposed each other as further seen in FIG. 9. At this point, the stop 312 on the rotation plate impinges on the opposite side of pin 300 from that of stop 310, and bar rack 150 has shifted from its full right position to the full left position, shown in FIG. 7. In doing this, the limited play between the bar rack 150 and bar 136 causes the pin 242 to lift during initial rotation of the motor drive shaft 108 to unlock the bar 136 and the rotation rack 96 associated with rotation shaft 70 at the same time closing the normally open switch contacts of valve open control switch 158. Further, as the bar 136 reaches its extreme left position, and prior to abutting against projection 220 of sidewall 126 of casing section 28, the inclined face 244 of the bar 136 contacts plunger 200 to raise the plunger against the biasing spring 202 and to close the normally open switch contacts of delay switch 216.

In sequence, as the drive pin 274 on the drive plate 256 impinges against stop 308 of the translation plate 258, the translation plate 258 rotates clockwise with the drive plate 256 while rotation of the rotation plate 264 ceases. Ball 292 functions to effect a clutching connection between plates 256 and 258 as shown in FIG. 9a, and ball 292 is retained in a dotted line position shown in FIG. 12. The translation plate 258 continues to rotate 90° until the stop 306 of the translation plate 258 impacts against the right side of pin 298 stopping further rotation of the translation plate 258. During this time, the bar rack 116 is driven by the rotating pinion 114 integral with the translation plate 258, initially causing no movement of the bar 120 from right to left until the left hand end of bar rack 116 reaches the end of recess 118 within bar 120 and thereupon moving the bar 120 to the position shown in FIG. 6. As the bar reaches the position where its bore 180 is in alignment with bore 160 within casing 30, the plunger 166 drops under the bias of spring 178 to mechanically lock the valve in full closed position, the translation shaft 70 having rotated approximately 60° to cam the valve poppet closed fully on seat 38. The pin 182 performs a mechanical interlock function, while the plunger 166 permits the normally closed contacts of the valve closed control switch 156 to open terminating energization of motor 14.

From the above, it may be seen that the present invention provides an improved spherical poppet valve which is supported by a rotating flow tube which when in the closed position, supports the valve poppet and exerts uniform pressure on the poppet against the valve seat to spring load the poppet in seating contact. The flow tube permits the poppet to be rotated into perfect alignment with the inlet and the outlet of the valve in open position for maximum flow control and minimum effect on flow by the presence of the spherical poppet support. The translation and rotation movement of the spherical poppet and flow tube is conducted through a hermetically saled barrier of a welded metal bellows with driving provided through appropriate racks and pinions. The sequence control mechanism and the motor are isolated from the fluid being handled and may be properly lubricated for long life. Further the position control switches are outside of the motor compartment and hermetically sealed, and the motor speed reducer and brake assembly is encased in a separate housing sealed from the main motor control compartment permitting the motor leads to be brought out through hermetic sealed connector.

In deference to the referred to patent and copending application, the present application allows two distinct, separated movements of two elements to be achieved from a single driver and with a stop and mechanical interlock of one element before the other element can move. For the smooth flow control valve of the present invention, this is desirable in order to keep the control in the sealed portion of the valve and consequent envelope size to a minimum and it also has the advantage of not rotating the shaft and poppet/flow tube together after the poppet retracts, as it allows lower geometric clearances.

While the invention has been particularly shown and described with reference to a preferred embodiment thereof, it will be understood by those skilled in the art that various changes in form and details may be made therein without departing from the spirit and scope of the invention.

What is claimed is:

1. In a spherical poppet valve of the type wherein a spherical valve poppet is pivotably mounted within a spherical valve casing for rotation from a first axially in-line position with respect to an annular valve seat to a second valve open position at an angle thereto and outside of the axial flow path through the seat opening, and shaft means are provided for rotating said valve poppet and for axially shifting said poppet relative to said seat when in axial alignment with said opening to fully close the said valve, the improvement wherein:
   a radially compressible spring loading flow tube is mounted within said casing for rotation between an axially in-line position with respect to said annular valve seat and a position generally at right angles thereto, said flow tube is movable laterally at right angles to its axis, and
   means for mounting said spherical valve poppet on the side of said flow tube at a position such that said flow tube during radial compression spring biases said valve poppet against said valve seat when said spherical valve poppet is axially shifted into peripheral contact with said annular valve seat during lateral shifting of said flow tube which is at right angles to said seat, toward said valve seat to fully close said valve.

2. The spherical poppet valve as claimed in claim 1, wherein said tube has a thickness which tapers transversely with said tube being thickest at the point where the valve poppet is mounted to the side of the tube and is thinnest on the opposite side thereof, to thereby balance the loading of the bearings supporting said tube for rotation about the axis of said shaft means.

3. In a spherical poppet valve of the type wherein a spherical valve poppet is pivotably mounted within a spherical valve casing for rotation from a first axially in-line position with respect to an annular valve seat to a second valve open position at an angle thereto and outside of the axial flow path through the seat opening, and shaft means are provided for rotating said valve poppet and for axially shifting said poppet relative to said seat when in axial alignment with said opening to fully close the said valve, the improvement wherein:
   a radially compressible spring loading flow tube is mounted within said casing for rotation between an axially in-line position with respect to said annular valve seat and a position generally at right angles thereto, said flow tube is movable laterally at right angles to its axis,
   means for mounting said spherical valve poppet on the side of the flow tube at a position such that said flow tube during radial compression spring biases said valve poppet against said valve seat when said spherical valve poppet is axially shifted into peripheral contact with said annular valve seat during lateral shifting of said flow tube which is at right angles to said seat, toward said seat to fully close said valve, and
   wherein said shaft means comprises a first, translation shaft which intersects said flow tube and a second hollow, rotation shaft concentrically mounted on said first shaft for rotary movement independent of said first shaft, aligned holes are formed within opposite sides of said tube, said first shaft extends through said holes, eccentrics are formed on said first shaft coincident with said holes with said tube holes defining follower means within said tube, and means are provided for sequentially rotating said shafts to cause said tube and said spherical poppet to respectively rotate about the axis of both shafts and translate towards and away from said annular valve seat.

4. In a spherical poppet valve of the type wherein a spherical valve poppet is pivotably mounted within a spherical valve casing for rotation from a first axially in-line position with respect to an annular seat to a second valve open position at an angle thereto and outside of the axial flow path through the seat opening, and shaft means are provided for rotating said valve poppet and for axially shifting said valve poppet relative to said seat when in axial alignment with said opening to fully close said valve, the improvement wherein:

a radially compressible spring loading flow tube is mounted within said casing for rotation between an axially in line position with respect to said annular valve seat and a position generally at right angles thereto, said flow tube is movable laterally at right angles to its axis, means are provided for mounting said spherical valve poppet on the side of said flow tube at a position such that said flow tube during radial compression spring biases said valve poppet against said valve seat when said spherical valve poppet is axially shifted into peripheral contact with said annular seat during lateral shifting of said flow tube which is at right angles to said seat, toward said valve seat to fully close said valve, said tube has a thickness which tapers transversely with said tube being thickest at the point where the valve poppet is mounted to the side of the tube and being thinnest on the opposite side thereof, and wherein said shaft means comprises a first, translation shaft which intersects with said flow tube and a second hollow, rotation shaft concentrically mounted on said first shaft for rotary movement independent of said first shaft, aligned holes are formed within opposite sides of said tube, said first shaft extends through said holes, eccentrics are formed on said first shaft coincident with said holes with said tube holes defining follower means within said tube, and means are provided for sequentially rotating said shafts to cause said tube and said spherical poppet to respectively rotate about the axis of both shafts and translate towards and away from said annular valve seat.

5. The spherical poppet valve as claimed in claim 3, wherein said means for effecting independent rotation of said translation shaft and said rotation shaft comprises; rack and pinion means including a slidable translation rack and a slidable rotation rack, a bidirectional drive shaft mounted for rotation parallel to said concentric translation and rotation shafts, motor means for bidirectionally rotating said drive shaft, dual pinion means carried by said drive shaft, means for selectively coupling said drive shaft to said pinion means, two bars slidably mounted for movement in the direction of their longitudinal axis, a longitudinal recess within each bar, a bar rack slidably mounted within each bar recess and being of a length less than the length of said recess and in mesh with a respective pinion means, and means for rigidly connecting one bar to said translation rack and one bar to said rotation rack, and hermetic seal means interposed between said bars and said rotation and translation racks respectively; whereby, rotation of said drive shaft means in either direction causes limited, initial play between said bars and said bar racks prior to shifting of said translation and rotation racks.

6. The spherical poppet valve as claimed in claim 5, wherein said valve casing includes a bore at right angles to the longitudinal axis of said bar coupled to said translation rack, opposite thereto and facing the same, a corresponding bore is formed within said bar and opens into said bar recess, a spring biased plunger is mounted within said casing bore, a pin is slidably mounted within said bar bore, projectible into said recess in abutment with said bar rack, and said casing bore and said bar bore are located such that when said drive shaft moves said bar to drive said spherical valve poppet into spring biased contact with said annular valve seat through said translation shaft eccentric and said tube follower means, alignment effected between the bores of said casing and said bar causes said spring biased plunger to be partially depressed into said bar bore to lock said bar and prevent further shifting thereof.

7. The spherical poppet valve as claimed in claim 6, wherein said pin terminates in an inclined end face facing said bar rack such that longitudinal shifting of said bar rack relative to said bar in one direction forces said pin and said plunger to move within their respective bores against the bias of the spring biased plunger to unlock said bar when the end face of said bar rack abuts an end of said bar recess.

8. The spherical poppet valve as claimed in claim 6, further comprising a valve condition control switch mounted adjacent said plunger, means electrically connecting said control switch to said motor means, and means operatively positioning said plunger relative to said switch such that shifting of said spring biased plunger effects a change of state of the switch contacts carried by said control switch to effect a change in operation of said motor means.

9. The spherical poppet valve as claimed in claim 6, further comprising a pressure switch operatively mounted within the discharge side of said valve casing and responsive to valve open conditions and flow of fluid therein, said pressure switch having normally open contacts closable in response to fluid pressure acting on said switch, and said poppet valve further comprises a delay switch having normally closed contacts and being mounted within said casing to the side of said indicator switch and connected in parallel with the contacts of said pressure switch, a spring biased delay switch plunger is mounted within a bore of said valve casing and faces said slidable bar coupled to said rotation rack, said bar includes a face opposing the end of said delay switch plunger such that with the valve in closed position, movement of said bar to effect rotation of said valve poppet from an axial in-line position with respect to said annular valve seat to a position at some angle thereto and out of the flow path permits the delay contacts to remain closed until fluid flow through said valve casing closes said normally open pressure switch contacts to complete a circuit bypassing said delay switch.

10. The spherical poppet valve as claimed in claim 5, further comprising a sequence control mechanism for effecting sequential rotation of said first and second pinion means carried by said drive shaft, said sequence control mechanism comprising a drive plate fixed to said drive shaft and rotatable therewith, a translation plate and a rotation plate rotatably mounted on said shaft on opposite sides of said drive plate, said translation plate and said rotation plates carrying respective pinion means for rotation therewith, and means for effecting drive engagement between said drive plate and said translation plate and said drive plate and said rotation plate in sequence in response to rotation of said drive shaft in a particular direction and an opposite drive sequence when said shaft is rotated in the opposite direction.

11. The spherical poppet valve as claimed in claim 10, wherein said means for sequentially effecting drive engagement between said drive plate and said translation plate and said rotation plate, comprise a drive pin fixed to said drive plate at the periphery thereof and rotatable therewith, and radial projections on the periphery of said translation plate and said rotation plate respectively with said drive pin protruding to each side of said drive plate and said radial projections on the peripheries of said translation plate and said rotation plate being positioned in the path of rotation of the drive pin on said drive plate such that rotation of said drive plate in response to rotation of said drive shaft causes said drive pin to contact said projections and to drive said translation plate and said rotation plate in sequence.

12. The spherical poppet valve as claimed in claim 11, further comprising stop pins fixedly mounted relative to said casing, and positioned in the path of said radial projections of said translation and rotation plates to limit rotation of said translation plate and said rotation plate in response to rotation of said drive plate.

13. The spherical poppet valve as claimed in claim 12, further comprising back-to-back spherical recesses formed within opposite sides of said drive plate, circular holes formed within said translation plate and said rotation plate at radial positions conforming to said back-to-back spherical recesses, opposed, aligned bored formed within respective sidewalls of said valve casing facing said translation plate and said rotation plate at positions alignable with said holes, spring biased plungers within respective bores biased towards each other, and clutch balls positioned within said circular holes of said translation and rotation plates and said back-to-back spherical recesses of said drive plate; whereby, a clutching action is achieved between said drive plate and said translation plate and said rotation plate respectively with transfer of clutching action occurring at the point where said spring biased plungers, said balls, and said circular holes within said translation plate and said rotation plate are in axial alignment.

14. The spherical poppet valve as claimed in claim 13, wherein said translation plate includes projection stops at 90° circumferentially spaced positions and said fixed pin carried by said casing is positioned between these projections so as to limit rotation of said translation plate to a 90° in either direction.

15. The spherical poppet valve as claimed in claim 13, wherein said rotation plate includes circumferentially spaced radial projection stops circumferentially spaced 135° from each other on the periphery thereof, and a stop pin is positioned on said casing between said stops so as to limit angular rotation of said rotation plate driven by said drive plate to 135° in either direction.

16. The spherical poppet valve as claimed in claim 3, further comprising a sequence control mechanism for effecting sequential rotation of said first and second pinion means carrier by said drive shaft, said sequence control mechanism comprising a drive plate fixed to said drive shaft and rotatable therewith, a translation plate and a rotation plate rotatably mounted on said shaft on opposite sides of said drive plate, said translation plate and said rotation plates carrying respective pinion means for rotation therewith, and means for effecting drive engagement between said drive plate and said translation plate and said drive plate and said rotation plate in sequence in response to rotation of said drive shaft in a particular direction and an opposite drive sequence when said shaft is rotated in the opposite direction.

17. The spherical poppet valve as claimed in claim 16, wherein said means for sequentially effecting drive engagement between said drive plate and said translation plate and said rotation plate, comprise a drive pin fixed to said drive plate at the periphery thereof and rotatable therewith, and radial projections on the periphery of said translation plate and said rotation plate respectively with said drive pin protruding to each side of said drive plate and said radial projections on the peripheries of said translation plate and said rotation plate being positioned in the path of said drive plate pin such that rotation of said drive plate in response to rotation of said drive shaft causes said drive pin to contact said projections and to drive said translation plate and said rotation plate in sequence.

18. The spherical poppet valve as claimed in claim 17, further comprising stop pins fixedly mounted relative to said casing, and positioned in the path of said radial projections to limit rotation of said translation plate and said rotation plate in response to rotation of said drive plate.

19. The spherical poppet valve as claimed in claim 18, further comprising back-to-back spherical recesses formed within opposite sides of said drive plate, circular holes formed within said translation plate and said rotation plate at radial positions conforming to said back-to-back spherical recesses, opposed, aligned bores formed within respective sidewalls of said valve casing facing said translation plate and said rotation plate at positions alignable with said holes and recesses, spring biased plungers within respective bores biased towards each other, and clutch balls positioned within said circular holes of said translation and rotation plates and said back-to-back spherical recesses of said drive plate; whereby, a clutching action is achieved between said drive plate and said translation plate and said drive plate and rotation plate, respectively, with transfer of clutching action occurring at the point where said spring biased plungers, said balls, and said circular holes within said translation plate and said rotation plate are in axial alignment.

20. In a spherical poppet valve of the type wherein a spherical valve poppet is pivotably mounted within a spherical valve casing for rotation from a first axially in-line position with respect to an annular valve seat to a second valve open position at an angle thereto and outside of the axial flow path through the seat opening, and first and second shaft means are provided for respectively rotating the valve poppet and for axially shifting said poppet relative to said seat when in axial alignment with seat opening to fully close the valve, and wherein said first and second shaft means include pinions fixed thereto and in mesh with separate racks for effecting independent rotation of said shaft means, the improvement comprising:

a sequence control mechanism for effecting sequential shifting of said racks associated with said first and second shaft means, said sequence control mechanism comprising:

a drive plate, a bidirectional drive motor including a drive shaft fixed to said drive plate for rotating the same, a translation plate and a rotation plate rotatably mounted on said drive shaft on opposite sides of said drive plate, said translation plate and said rotation plate carrying respectively pinion means for rotation therewith and being in mesh with respective racks for effecting rotation of said pinion means carried by said first and second shaft means, and means for effecting sequential drive engagement between said drive plate and said translation plate and said drive plate and said rotation plate in response to rotation of said drive shaft in a particular direction and an opposite drive sequence when said shaft in rotated in the opposite direction.

21. The spherical poppet valve as claimed in claim 20, wherein said means for sequentially effecting drive engagement between the drive plate and the translation plate and the drive plate and said rotation plate comprise: a drive pin fixed to said drive plate at the periphery thereof and rotatable therewith, and radial projections on the periphery of said translation plate and said rotation plate respectively, with said drive pin protruding to each side of said drive plate and said radial projections on the peripheries of said translation plate and said rotation plate being positioned in the path of said drive plate pin, such that rotation of said drive plate in response to rotation of said drive shaft causes the drive pin to contact said projections and to drive said translation plate and said rotation plate in sequence.

22. The spherical poppet valve as claimed in claim 21, further comprising stop pins fixedly mounted relative to said casing and positioned in the path of said radial projections to limit rotation of said translation plate and said rotation plate in response to rotation of said drive plate.

23. The spherical poppet valve as claimed in claim 22, further comprising back-to-back spherical recesses formed within opposite sides of said drive plate, circular holes formed within said translation plate and said rotation plate at radial positions conforming to said back-to-back spherical recesses, opposed, aligned bores formed within respective sidewalls of said valve casing facing said translation plate and said rotation plate and positioned for alignment with said back-to-back spherical recesses and said circular holes within respective plates during rotation of said plates, spring biased plungers mounted within respective bores and biased towards each other, and clutch balls positioned within said circular holes of said translation and rotation plates and said back-to-back spherical recesses of said drive plate; whereby, a clutching action is achieved between said drive plate and said translation plate and said drive plate and said rotation plate respectively with transfer of clutching action occurring at the point where said spring biased plungers, said balls, and said circular holes within said translation plate and said rotation plate are in axial alignment.

* * * * *